United States Patent [19]
Schneider

[11] Patent Number: 5,372,757
[45] Date of Patent: Dec. 13, 1994

[54] APPARATUS AND METHOD FOR SHEATHING OPTICAL FIBERS

[75] Inventor: Randy G. Schneider, Raleigh, N.C.

[73] Assignee: Tensor Machinery Ltd., Quebec, Canada

[21] Appl. No.: 116,402

[22] Filed: Sep. 3, 1993

[51] Int. Cl.$^5$ .............................. B29D 11/00
[52] U.S. Cl. ........................ 264/1.28; 264/1.6; 264/2.7; 264/173; 264/174; 264/210.1; 264/288.4; 425/113; 425/114; 425/135; 427/163.2
[58] Field of Search .............. 427/163; 385/102, 107, 385/115; 264/1.5, 174, 210.1, 1.6, 2.7, 173, 288.4; 425/113, 114, 133.1, 135

[56] References Cited

U.S. PATENT DOCUMENTS

| | | |
|---|---|---|
| 4,409,154 | 10/1983 | Grenat ........................ 264/1.5 |
| 4,414,165 | 11/1983 | Oestreich et al. . |
| 4,446,686 | 5/1984 | Panuska et al. . |
| 4,458,476 | 7/1984 | Mayr et al. . |
| 4,474,638 | 10/1984 | Einsle ......................... 264/1.5 |
| 4,583,929 | 4/1986 | Becker et al. . |
| 4,585,406 | 4/1986 | Ravela . |
| 4,640,576 | 2/1987 | Eastwood et al. . |
| 4,728,470 | 3/1988 | Einsle et al. . |
| 4,772,435 | 9/1988 | Schlaeppi et al. . |
| 4,814,116 | 3/1989 | Oestreich et al. . |
| 4,826,278 | 5/1989 | Gartside, III et al. . |
| 4,893,998 | 1/1990 | Schlaeppi et al. . |
| 4,921,413 | 5/1990 | Blew . |
| 4,983,333 | 1/1991 | Blew . |
| 4,985,185 | 1/1991 | Mayr et al. .................. 264/1.5 |
| 5,092,117 | 3/1992 | Paivinen et al. . |
| 5,102,584 | 4/1992 | Paivinen et al. . |
| 5,187,763 | 2/1993 | Tu . |

*Primary Examiner*—Mathieu D. Vargot
*Attorney, Agent, or Firm*—Bell, Seltzer, Park & Gibson

[57] ABSTRACT

A loose tube element including a plastic sheath containing a grease-like material and an optical fiber or bundle of optical fibers or a ribbon of optical fibers is pulled from an extruder crosshead through a cooling bath and around a constant speed capstan. The loose tube element travels around the constant speed capstan a number of times and as it exits the capstan it is subject to a tensile force provided by a variable torque control capstan. The tensile force causes elongation of the plastic sheath, causes the optical fiber to be pulled taut and thereby controls the ratio of fiber length to sheath length within the loose tube element. While subjected to the tensile force, the element is subsequently cooled, causing the elongation of the plastic sheath to become permanent and thus fixing the fiber-to-sheath length ratio. The fiber-to-sheath length ratio is not affected by variation in production line speed and the production line may operate at very high speeds while producing loose tube elements with consistent fiber-to-sheath length ratios. The loose tube element is then stored on a take-up reel or is used as a stranding element or core element in a fiber optic cable.

47 Claims, 6 Drawing Sheets

APPARATUS AND METHOD FOR SHEATHING OPTICAL FIBERS

FIELD AND BACKGROUND OF THE INVENTION

This invention relates to the manufacture of loose tube elements for use in fiber optic cables. More particularly, the invention relates to the manufacture of such elements with controlled fiber-to-sheath ratios over a wide range of production speeds.

As is well known, one method of assuring optimal transmission performance of optical fibers is to surround them in a grease-like material which is encased by a plastic sheath. This configuration is known as a "loose tube" construction. These loose tube elements can be subsequently stranded around a central strength member to form a cable, or alternatively can be individually overjacketed with a suitable strength member system to form a cable. The loose tube elements may contain individual optical fibers, or one or more bundles of optical fibers, or one or more ribbons containing arrays of parallel optical fibers bound together with a suitable binder, such as a UV curable acrylate composition. See for example, U.S. Pat. No. 4,826,278 to Garthside, III, et al.

Common to all of the above cable designs is that the optical fibers must be maintained in a stress-free condition in the finished cable. Moreover, this stress-free condition should be maintained across the operating temperature range of the cable once the cable is placed in its service location. A further constraint is that the fibers should not be subjected to excessive stress levels (i.e. approaching their "proof strength") either during the manufacturing process or during cable installation.

One means of assuring that the fibers are maintained in a stress-free condition in the final cable design is to control the ratio of the length of the fiber or fibers to the length of the surrounding protective strength. This fiber-to-sheath length ratio is well known in the industry as the "fiber excess length" or simply "XSL". The desired stress-free condition of the fibers can be maintained through control of the XSL, combined with the selection of suitable material and dimensions for the protective sheath and the exercise of prudence in the manufacturing process by placing minimum stress on the loose tube elements during the processing prior to coupling the elements to a strength member. A fiber-to-sheath length ratio of just over 1.000 is usually preferred, and a ratio well over 1.000 is detrimental.

One method of controlling the fiber-to-sheath length ratio is described in U.S. Pat. No. 4,414,165 to Oestreich, et al. According to that method a tubular jacket was formed around the fiber and grease-like material at an elevated temperature. The jacket was then simultaneously cooled and coiled with suitable back tension being applied to the fiber to align the fiber on the inner radius of curvature in the coiled configuration. Subsequently, the coiled configuration was cooled to ambient temperature and the shrinkage of the jacket, caused by cooling, produced the desired the fiber-to-sheath length ratio.

Another method of controlling the fiber-to-sheath length ratio is described in U.S. Pat. Nos. 4,772,435 and 4,893,998 to Schlaeppi, et al. According to that method, a withdrawal device pulled the sheath containing the fibers and grease-like material through a cooling vat while at the same time subjecting the fiber to a predetermined back tension. The sheath was subsequently pulled through a second cooling vat while subjecting the sheath to as little tensile stress as possible and keeping the fiber free of tensile stress. The sheath was cooled to a temperature in the second cooling vat which was lower than the temperature of the sheath in the first cooling vat.

The above methods all suffer in their ability to accommodate significant fluctuations in production line speed while at the same time maintaining a consistent fiber-to-sheath length ratio. Such fluctuations occur between start up speed and full line speed. Furthermore, these methods are limited in their maximum line speed above which the fiber-to-sheath length ratio begins to increase uncontrollably. This phenomenon can be explained as follows. If the distance between the extruder and the coiling device, which is pulling the sheath from the extruder, is fixed, and the cooling vat is placed in this fixed space, then as the line speed increases the temperature of the sheath as it engages the coiling device increases. If the fiber is to be aligned on the inner circumference of the sheath passing around the coiling device by applying a predetermined back tension to the fiber, then the temperature at which the fiber engages the inner circumference of the sheath increases with increasing line speed. Subsequent shrinkage of the sheath during cooling, which occurs when the sheath is coiled about the coiling device with the fiber engaging the inner circumference of the sheath, causes an increase in the fiber-to-sheath length ratio. Accordingly, the fiber-to-sheath length ratio increases with increasing line speed because the temperature of the sheath at the point where the fiber engages its inner circumference increases with increasing line speed. This causes an undesirably high fiber-to-sheath length ratio well over 1.000.

These deficiencies were noted in U.S. Pat. No. 4,814,116 to Oestreich, et al. That patent disclosed the use of a variable diameter haul off coiling device designed such that the diameter and corresponding effective length ratio between the fiber and the warm sheath could be varied as a function of line speed. Although that improvement benefitted the manufacture of a single-size tube over a limited range of line speeds, the ability of the haul off to provide a constant pulling speed on the extruded sheath was compromised because of flats which developed between the movable segments as the diameter of the haul off was expanded. The periodic variation in haul off speed manifested itself as sheath diameter fluctuations which compromised the quality of the finished product.

Other methods which have been used to attempt to control the fiber-to-sheath length ratio include (1) metering and controlling the length of fiber entering the extruder cross head as a function of the speed of the exit capstan; (2) heating the tube in an auxiliary furnace to promote residual shrink back of the plastic tubular sheath; (3) propelling the fiber into the tube via the grease velocity; (4) utilizing multiple storage disk cooling chambers; (5) elongating the plastic sheath just prior to winding on a storage reel via the use of a dual capstan with a fixed speed differential; and (6) twisting the composite loose tube and fibers during the manufacturing step.

None of the above-mentioned methods or apparatuses provide totally satisfactory solutions to the problem of controlling the fiber-to-sheath length ratio in a loose tube stranding element or central core element of a fiber optic cable. This is especially true when the production line is to be operated over a wide range of line speeds and with a variety sheath diameters required for different products. Prior art methods and apparatuses also have difficulty in achieving high line speeds with the recently developed grease-like materials due to their viscosity, higher critical yield stress and higher drip resistant ratings.

SUMMARY OF THE INVENTION

The foregoing problems and limitations of the prior art relating to the fiber-to-sheath length ratio in a loose tube element for a fiber optic cable have been addressed by the apparatus and method of the present invention.

Moreover, in accordance with the present invention, the fiber-to-sheath length ratio is effectively controlled while operating over a wide range of line speeds and with a variety of sheath diameters. The present invention also provides for producing loose tube elements at high production rates with effective control over the fiber-to-sheath length ratio.

In accordance with the present invention, limits on line speed variations and on maximum line speed are addressed by elongating and then cooling the plastic sheath subsequent to the initial coiling operation. As in previous processes, the process of the present invention provides for extruding a plastic sheath around a grease-like material and an optical fiber. This element is pulled through a cooling unit by a capstan and is then coiled about the capstan a number of times. The element is then pulled from the capstan while the sheath is still at a temperature which allows permanent elongation deformation. The tensile force exerted in this pulling operation causes the sheath to elongate at about the point where it is exiting the capstan and also causes the fiber to align against the inner wall of the sheath so that the fiber-to-sheath length ratio is less than one. The element is then cooled to ambient temperature while still subject to the tensile force, causing slight shrinkage of the sheath, so that the fiber-to-sheath length ratio is slightly higher than one. By controlling the tensile force applied to the sheath as a function of the sheath diameter, sheath material, and temperature of the sheath at the point of elongation, the final fiber length to sheath length ratio is controlled. The element can then be coiled or may continue on for further processing such as the addition of strength members.

Thus, in one aspect, the present invention provides a method for producing a loose tube element for a fiber optic cable, wherein control is provided over the fiber-to-sheath length ratio over a wide range of line speeds. The method includes advancing a fiber along a path of travel, surrounding the advancing fiber with a loosely fitting plastic sheath, applying a tensile force to the plastic sheath while the sheath is at an elevated temperature to elongate the sheath, and cooling the plastic sheath to ambient temperature while the sheath is subject to the tensile force.

The present invention also provides an apparatus which comprises means for directing an optical fiber along a path of travel and means disposed along the path of travel of the fiber for surrounding the fiber in a loosely fitting plastic sheath to form a loose tube element. A first moving means is disposed downstream for advancing the loose tube element along said path of travel and a second moving means is disposed along the path of travel downstream from the first moving means for applying a tensile force to the plastic sheath while the plastic sheath is at an elevated temperature to elongate the sheath. A cooling means is disposed along said path of travel downstream from said second moving means for cooling the loose tube element to ambient temperature while the plastic sheath is subject to said tensile force.

The apparatus, more particularly, may include a fiber payoff device for directing an optical fiber from a supply source along a path of travel while maintaining back tension on the optical fiber and an extruder disposed along the path of travel of the fiber for forming a loosely fitting plastic sheath surrounding the optical fiber. A pump cooperates with the extruder for pumping a grease-like material into a space between the fiber and the plastic sheath. A first cooling means is disposed along the path of travel downstream from the extruder for cooling the sheath, and a constant speed capstan is disposed along said path of travel downstream from said first cooling means for advancing said element at a substantially constant velocity. The loose tube element is coiled a plurality of turns about said capstan so that the capstan maintains a predetermined braking force against advancement of said element along the path of travel. Disposed downstream from the capstan is a pulling device comprising a variable torque control belt capstan adapted to apply a tensile force to the plastic sheath while the plastic sheath is at an elevated temperature to thereby elongate the sheath. A second cooling means is disposed along the path of travel downstream from the pulling device for cooling the loose tube element to ambient temperature while the plastic sheath is subject to said tensile force.

BRIEF DESCRIPTION OF THE DRAWINGS

Some of the features and advantages of the invention having been described, others will become apparent from the detailed description which follows, and from the accompanying drawings in which.

DETAILED DESCRIPTION OF THE ILLUSTRATED EMBODIMENTS

Figure 1:
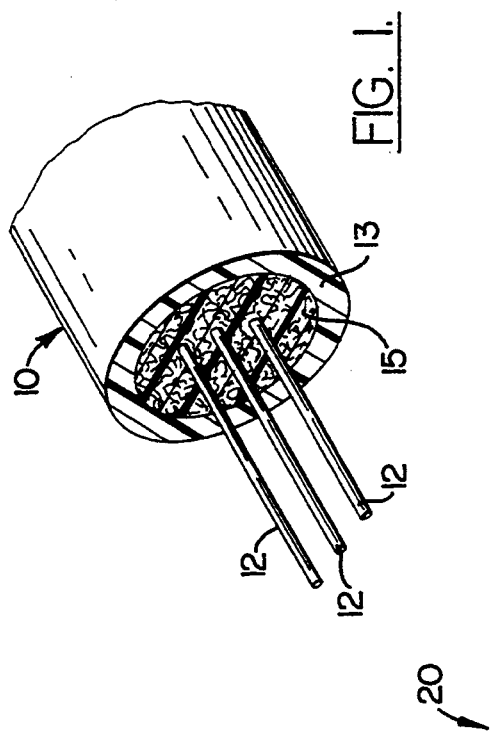
FIG. 1 is a cross-sectional view showing a loose tube element for a fiber optic cable.

Referring more particularly to the drawings, FIG. 1 illustrates a loose tube element 10 of the type which can be produced by the apparatus and method of the present invention. The loose tube element 10 includes one or more optical fibers 12 disposed in a loosely fitting surrounding tubular plastic sheath 13, with a grease-like material 15 filling the space between the optical fibers 12 and the inner circumference of the loosely fitting plastic sheath 13. In a loose tube element of this type, the grease-like material 15 generally serves three major purposes: (1) to prevent the fiber or fiber from sticking to the inner surface of the hot plastic sheath 13 during processing, (2) to provide a cushioning and supportive effect to the fiber 12 thus minimizing micro bending or macro bending which would deteriorate the transmission characteristics of the optical fiber 12, and (3) to prevent water migration both longitudinally along the loose tube element 10 and radially through the loose tube element 10. Early grease-like materials were comprised of an oil, fumed silica and optionally an organic thickener. Such early grease like material typically were characterized as possessing a low critical yield stress (less than 35 Pa) and a low resistance to oil separation and subsequent cable drip temperature ($<65°$ C). Newer commercially available advanced grease-like materials are characterized by having a high resistance to oil separation, a higher cable drip temperature ($>80°$ C.), and a higher critical yield stress (between 35 Pa and 70 Pa). Grease-like materials having a critical yield stress greater than 35 Pa and a drip temperature greater than 80° C. are preferred for use in the present invention.

The loose tube elements 10 produced by the apparatus may be subsequently utilized as a stranding element in fiber optic cable by combining with additional loose tube elements and stranding the multiplicity of loose tube elements around a central strength element to form a cable core. The resulting cable core is subsequently processed into a cable by adding a water blocking material, additional strength elements, a plastic jacket and optional metallic shields. The loose tube element produced by the apparatus may alternatively be utilized as a central core element in a fiber optic cable through the subsequent steps of adding to the exterior of the loose tube element a water blocking material, strength elements such as fiberglass, steel or Kevlar, a plastic jacket, and optional metallic shields.

The plastic sheath 13 is made of a suitable thermoplastic polymer, for example, a polybutyleneterephthlate (PBT) such as Vestador 3000 provided from Huls America, Inc., Piscataway, N.J. Other plastics such as Vestador 3030 may also be used. Optionally, the plastic sheath 13 may be of a dual layer construction formed from two different plastic materials. This is done with the use of two extruders and two crossheads, one immediately after the other, or in a co-extrusion process utilizing two extruders and a common crosshead. In a dual layer construction, the inner plastic sheath is typically comprised of either polyamide (amorphous nylon) available as TR-55 from Emser Industries, Sumter, S.C. or polycarbonate available as LEXAN from General Electric, Pittsfield, Mass. The outer plastic sheath is typically made of the same PBT as is utilized in a single layer loose tube element.

Figure 2:
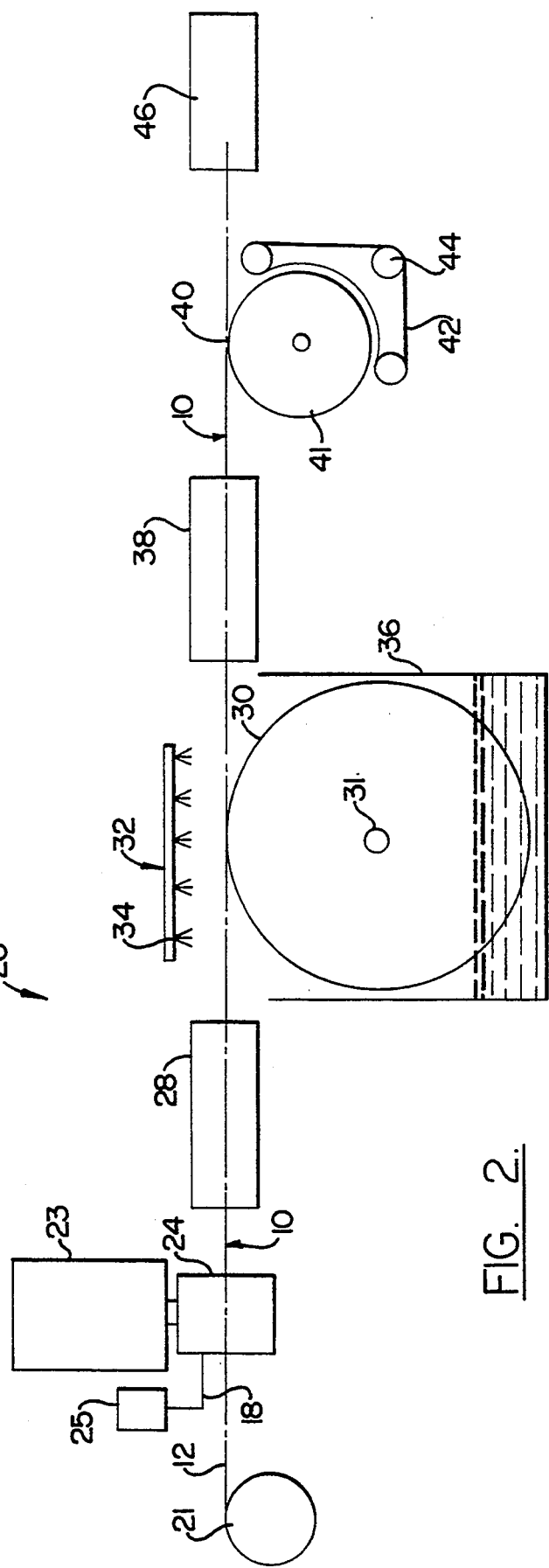
FIG. 2 is a schematic view of a manufacturing line for making loose tube elements according to the present invention.

In FIG. 2, the reference character 20 generally indicates an apparatus in accordance with one embodiment of the invention for producing the loose tube elements 10. For simplicity of illustration, the apparatus 20 of FIG. 1 shows the use of a single fiber payoff 21 to provide one fiber inside the loose tubular sheath 13. However, it will be understood by those familiar with this art that it is common to use any number of fibers in a loose tube element, and that the apparatus and method of the present invention can be used for producing loose tube elements with any number of optical fibers contained therein. For example, as many as 12 fibers may be provided in the element if the loose tube element is to be utilized as a stranding element and as many as 218 fibers if the loose tube element is to be utilized as a central core element in a fiber optic cable. The fibers may be supplied as individual fibers, or as one or more bundles or ribbons of fibers.

The tension controlled fiber payoff 21 provides a controlled back tension Upon the fiber 12. An extruder 23 provided with crosshead 24 forms a tubular plastic sheath 13 surrounding the fiber 12 to produce the loose tube element 10. A metering pump 25 connected to the crosshead 24 supplies a grease-like material to the interior of the loose tube element 10. After the sheath 13 is extruded about the grease-like material and the fiber 12 to form the loose tube element 10, the element is pulled through a first cooling unit 28 by a rotating constant speed capstan 30 about which the loose tube element 10 is coiled a plurality of turns. A temperature control unit, generally indicated at 32 is provided adjacent the capstan 30 for controlling the temperature of the element while on the capstan, as is explained more fully below. Upon leaving the capstan 30, the loose tube element 10 passes through a second cooling unit 38 and then a second pulling unit, generally indicated at 40, which in the embodiment illustrated takes the form of a variable torque control capstan 41 and cooperating belt drive 42. Upon leaving the second pulling unit 40, the loose tube element 10 may be further processed, as indicated at 46, either by being taken up by a suitable take-up device, such as reel or rotating plate, or by being directly formed into a fiber optic cable by combining with one or more reinforcing elements and additional sheath.

The major components of the apparatus now having been identified, the principle of operation of the method and apparatus of the present invention will now be described. Still referring to FIG. 2, the fiber payoff 21 from which the optical fiber is supplied comprises an independent tension controlled feedback loop coupled with a regenerative drive. Such a configuration permits controlling the tension in the fiber at a selected preferred level. For example, the tension is preferably controlled at a level of about 35 ±5 grams for a single fiber or about 150±10 grams for a 12 fiber ribbon.

The fiber or fibers from the fiber payoff 21 converge on a common path line adjacent the entry of the extruder crosshead 24. Where more than one fiber is used, the fibers may be bundled or stranded together in a known manner before entering the extruder crosshead. As the fiber enters the extruder crosshead, it becomes surrounded with the grease-like material, which is metered into a cavity in the extrusion crosshead by metering pump 25. Metering pump 25 is driven at a variable speed through a precision drive (not shown) which is coupled to the drive system of extruder 23 so that a fixed ratio of grease-like material and molten plastic is made available as line speed is varied. This fixed ratio can be adjusted for different tube dimensions produced. Inside the extruder crosshead 24, the molten plastic material flows around the fiber 12 and grease-like material 15, and upon emerging from the die orifice of the crosshead 24, a continuous annular tubular sheath 13 is formed surrounding the fibers and grease-like material, thus producing the loose tube element 10.

Figure 3A:
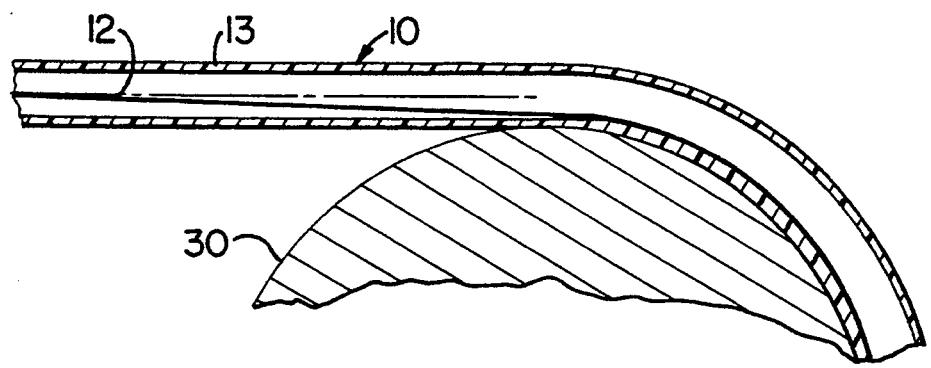
FIGS. 3A, 3B and 3C are diagrammatic partial sectional views of the loose tube element at the point at which it engages the speed control capstan and showing how the fiber is disposed within the surrounding tube under various operating conditions.
Figure 3B:
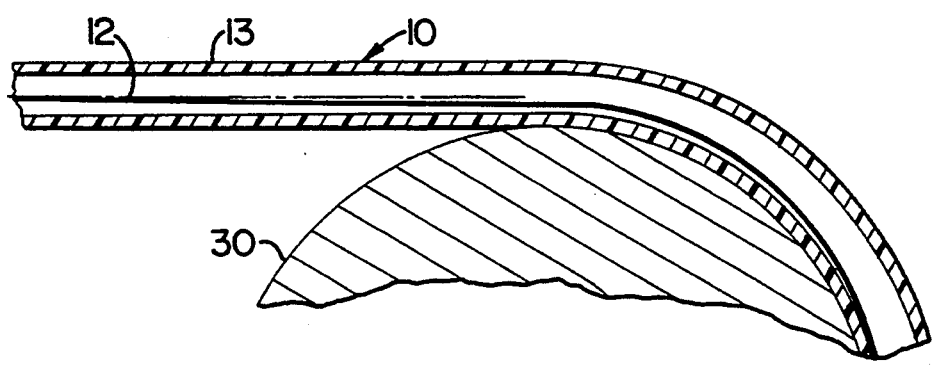
Figure 3C:
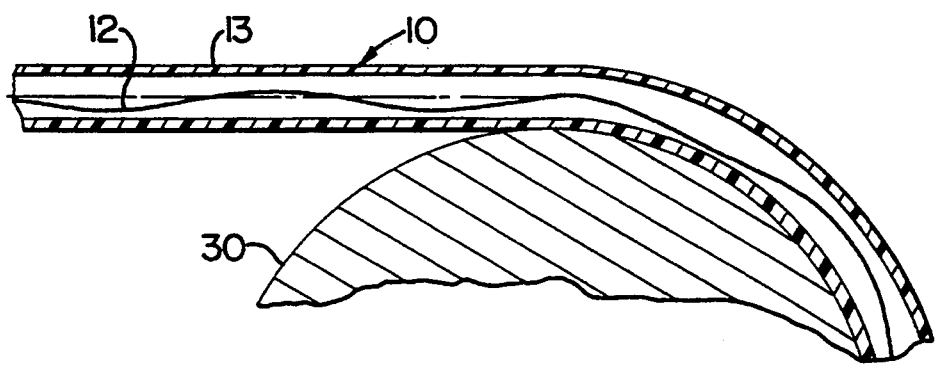

The hot tubular sheath is quenched and cooled in the first cooling bath 28. The hot tubular sheath also begins to shrink longitudinally as it cools, thus increasing the fiber-to-sheath length ratio. The back tension applied to the fiber by the tension controlled fiber payoff 21 tends to exert a shearing force on the grease-like material which is coupled to the plastic sheath 13. As long as the force from the tension controlled payoff 21 acting on the fiber is greater than the critical yield stress of the grease-like material, the fiber will continue to shear through the grease-like material and maintain a fiber-to-sheath length ratio approaching 1.00. The residual force acting on the fiber decreases as a function of distance along the path of travel from the extrusion crosshead 22. At some defined back tension applied to the fiber, some defined length of first cooling bath 28, some critical yield stress of the grease-like material, and some maximum line speed, the fiber can no longer be maintained adjacent the inner circumference of the sheath 13 as it is coiled about the speed control capstan 30. FIGS. 3A, 3B, and 3C illustrate the longitudinal cross section of the sheath 13 as it approaches the capstan 30 after being quenched in first cooling bath 28. In FIG. 3A the back tension on fiber 12 is sufficient to pull back the excess fiber length due to shrinkage of the sheath 13. However if the length of cooling bath 28 is increased, for example to accommodate a faster line speed, an increased back tension would be required. Because the back tension is limited it may not be sufficient at higher line speeds. FIG. 3B illustrates the element 10 approaching the capstan 30 with insufficient back tension. As can be seen in FIG. 3B the fiber 12 is not aligned against the inner circumference of the plastic sheath 13 as it is wound around the capstan 30. This results in a fiber-to-sheath length ratio greater than 1.0. FIG. 3C is illustrative of grossly insufficient back tension such as would be seen at very high line speeds. Due to the shrinkage of the plastic sheath 13 and the insufficient back tension upon the fiber 12 there is an extreme excess of fiber length with respect to sheath length, causing the fiber 12 to bend.

Referring to FIG. 2, the loose tube element 10 is wound about capstan 30 a number of times. In order to prevent any slippage between the loose tube element and the capstan 30, at least three complete wraps of the element about the capstan are utilized. In the preferred embodiment 5-8 complete 360° wraps are utilized. The rotational speed of the capstan 30 is electronically synchronized with the extruder 23 and the metering pump 25 for a given tube dimension. As the loose tube element 10 travels about the capstan 30, a temperature control unit 32 sprays the element with a heat transfer liquid from manifold 34. The heat transfer liquid is typically water, however mixtures of ethylene glycol and water or other fluids may be used. The heat transfer liquid collects in chamber 36 and is recirculated back to manifold 34. The heat transfer unit 32 serves the purpose of cooling the loose tube element 10 as it travels about the capstan 30 to a temperature where the plastic sheath 13 exhibits a proper elasticity. The heat transfer liquid is applied at a temperature which is intended to reduce the effective modulus of the plastic material of the tubular sheath 13 so that the sheath can be permanently elongated by application of tensile force to the sheath 13.

After traveling about the capstan 30 a number of times, the element 10 leaves the capstan and is pulled by a second pulling means 40, shown in the form of a variable torque control capstan 41 and a cooperating belt 42 which is driven by pulley 44. The tensile force imparted to the loose tube element 10 by the second pulling means 40 creates a tensile stress in the sheath 13 during its final rotation about the capstan 30 and causes the sheath 13 to elongate. Upon leaving the capstan 30 the loose tube element 10 is cooled to ambient temperature in second cooling bath 38 while still subject to the tensile force, resulting in a permanent elongated deformation of the loose tubular sheath 13.

The capstan 30 is driven by a shaft 31 which is coupled to a gearbox and motor (not shown). A regenerative drive and servo motor are employed to assure that the rotational speed of capstan 30 does not fluctuate as a result of tensile forces being applied to the tubular sheath 13 as it exits the capstan 30, along its path through the second cooling bath and second pulling means 40. Capstan 30 thus functions both for pulling the element 10 from the extruder 23 and through the first cooling bath 28 and as a brake against the tensile force exerted upon the element 10 by the second pulling means 40, thus allowing for the elongation of the plastic sheath 13.

Figure 4A:
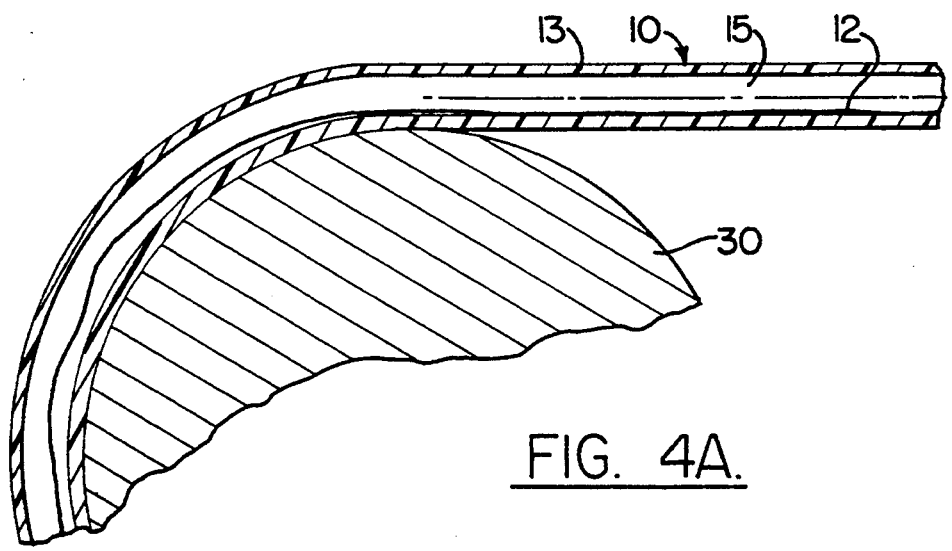
FIGS. 4A, 4B and 4C are diagrammatic partial sectional views of the loose tube element at the point at which it disengages the speed control capstan and showing how the fiber is disposed within the surrounding tube under various operating conditions.
Figure 4B:
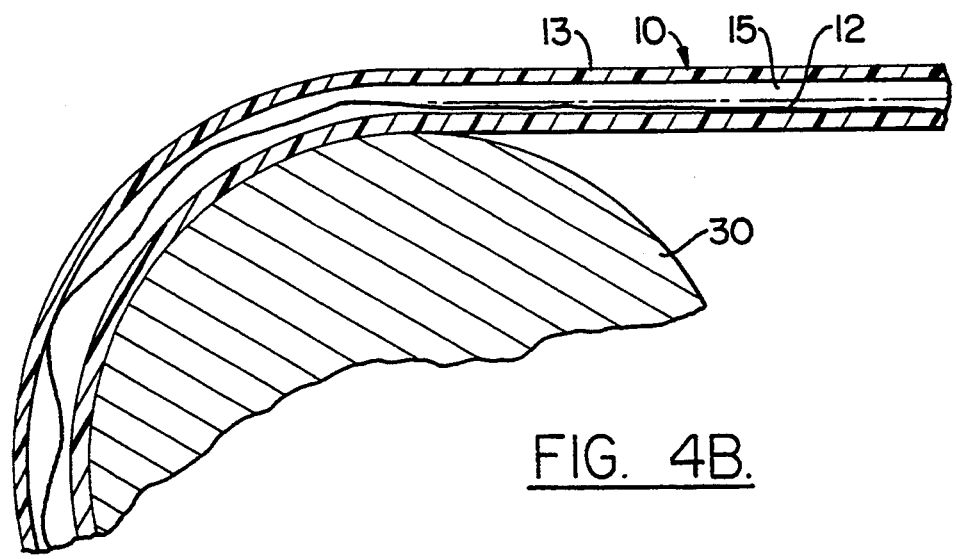
Figure 4C:
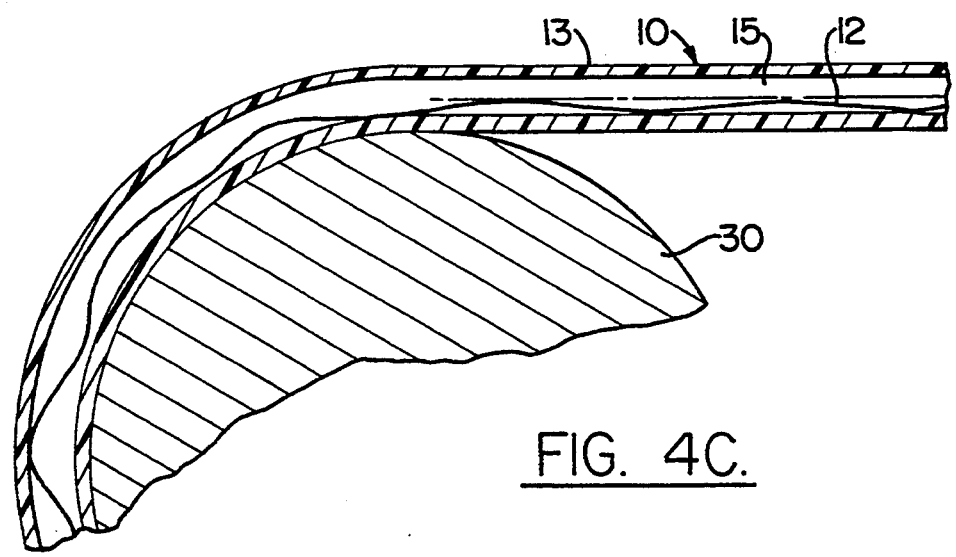

FIGS. 4A, 4B, and 4C show a longitudinal cross section of the element 10 as it exits constant speed capstan 30. These figures show the excess length of fiber 12 relative to the length of plastic sheath 13 and correspond respectively to the fiber length and sheath length approaching the capstan 30 as shown in FIGS. 3A, 3B, and 3C. As FIGS. 4A, 4B and 4C illustrate, in each instance as the element exits the constant speed capstan 30 there is an excess of fiber length relative to sheath length. However as the sheath is elongated, this excess is overcome, and the fiber 12 positions itself adjacent to the inner circumference of the sheath 13. This results in a fiber-to-sheath length ratio of less than 1.0. The loose tube element 10 is then cooled to ambient temperature in the second cooling bath 38 while still subject to the tensile force thereby making the elongation permanent.

Figure 5:
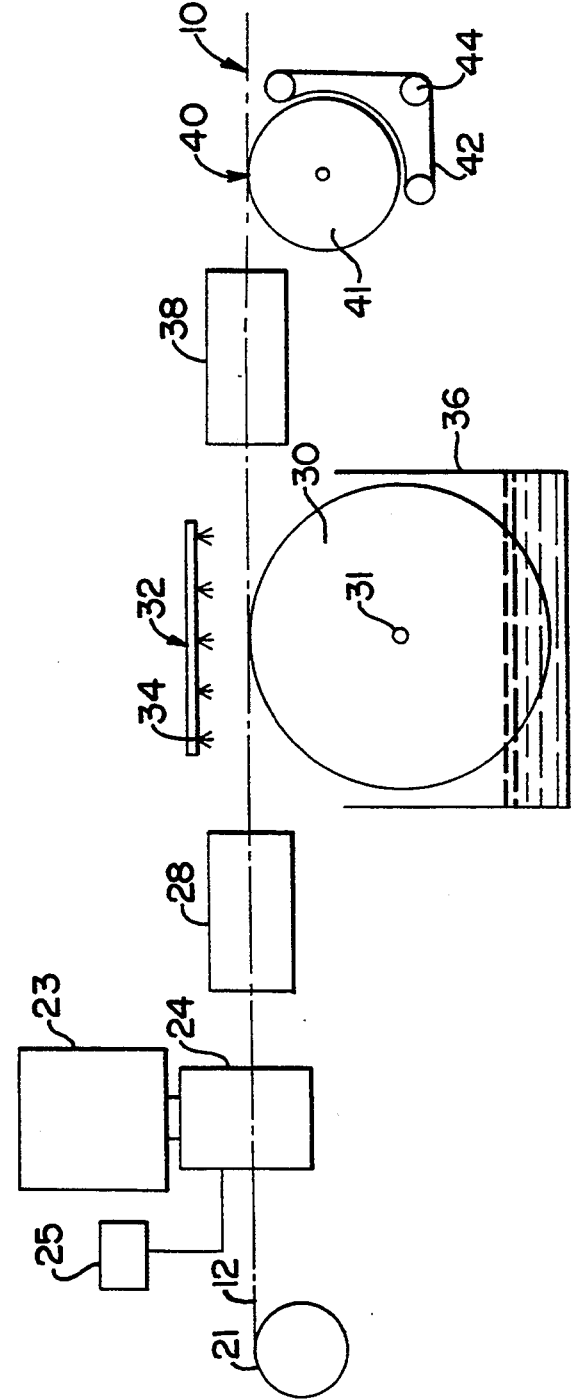
FIG. 5 is a graphical view of the relative fiber-to-sheath length ratios at various stages along the path of travel through the process of the present invention.

Referring to FIG. 5, the fiber length relative to sheath length is shown graphically at various stages along the path of travel corresponding to the locations indicated in FIG. 2 by the arrows labeled "A" to "E". As the loose tube element 10 begins to cool in the first cooling bath 28, thermal contraction causes the plastic sheath 13 to shrink, thereby causing an excess fiber length relative to sheath length as seen in FIG. 4C. Counteracting this shrinkage of the plastic sheath 13 is the back tension on the fiber 12 imparted by fiber payoff 21. At increased distances from fiber payoff 21 along the path of travel, this back tension upon the fiber 12 is dissipated. The excess of fiber length to sheath length is shown at A.

During the period that the element 10 is wrapped around the capstan 30, some additional thermally induced contraction occurs. The fiber length to sheath length ratio during the last wrap around capstan 30 is shown at B in FIG. 5. The tensile force applied to the element 10 as it exits the capstan 30 causes elongation of the sheath 13 relative to the fiber 12 thereby reducing fiber-to-sheath length ratio. The fiber-to-sheath length ratio at the point where the element exits the capstan 30 is shown at C in FIG. 5. The elongation at that point is such that the fiber-to-sheath length ratio is less than 1.0. This elongation continues to occur until the element 10 enters the second cooling unit 38 at which point the fiber-to-sheath length ratio is at a minimum as seen at D. As the element is cooled in second cooling bath 38, although still subject to the tensile force, some shrinkage of the plastic sheath 13 will occur, thereby causing the fiber-to-sheath length ratio to increase approaching a value of 1.0. By the time the element has cooled to ambient temperature and upon exiting second cooling bath 38, fiber-to-sheath length ratio is at a desired point, slightly higher than 1.0. This is seen at E. The element continues along the path of travel around the variable torque control capstan 41 and may then be taken up for storage and optical testing on a reel as indicated at 46. Alternatively, the loose tube element 10 may continue on for further processing, such as combining the element 10 with additional loose tube elements and stranding them around a central strength element to form a cable core or adding water-blocking material and strength elements to the exterior of the loose tube element 10.

Figure 6:
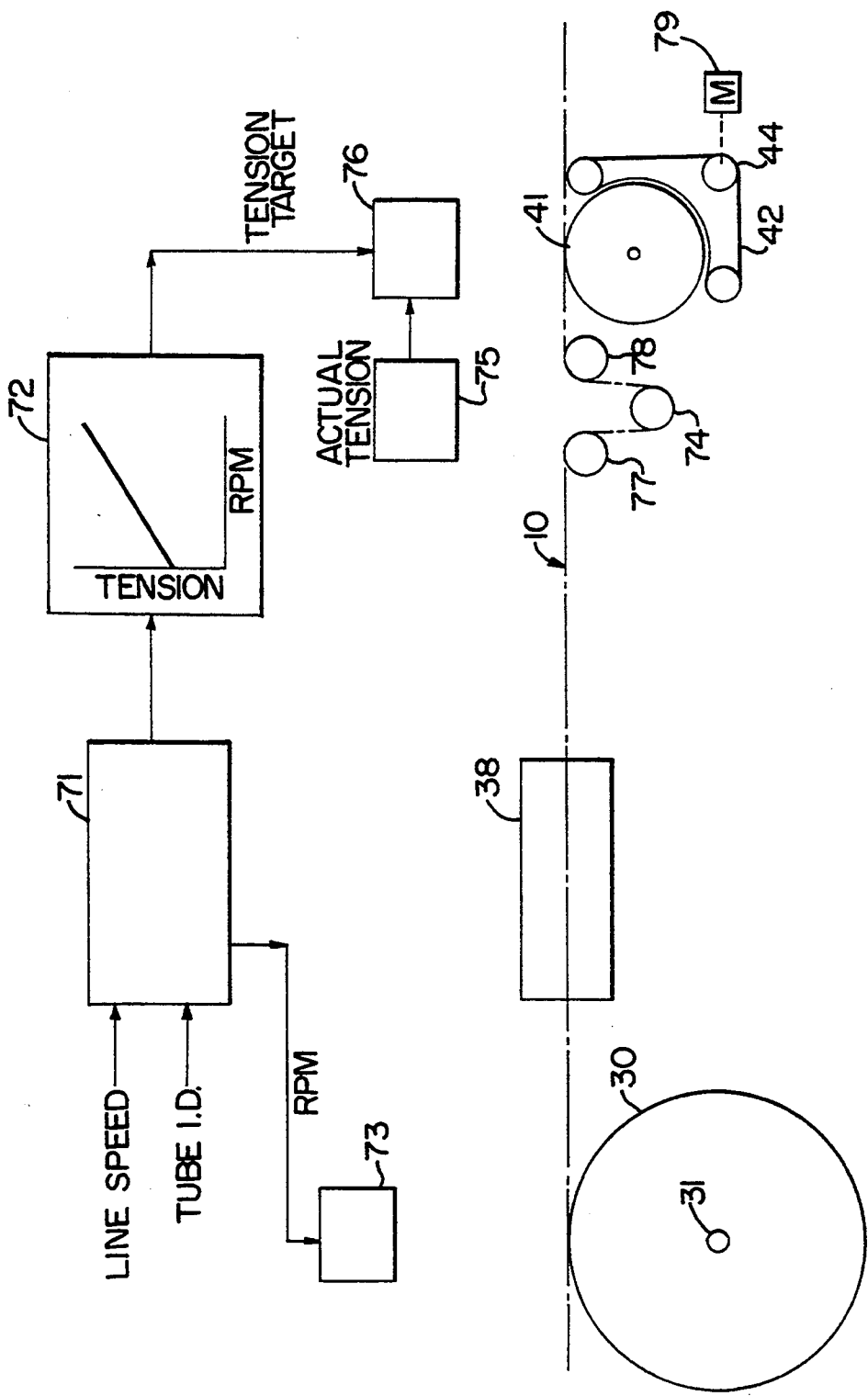
FIG. 6 is a schematic view of an automatic control system for a manufacturing line for making loose tube elements according to the present invention.

Referring now to FIG. 6, a control apparatus 70 is shown for controlling the tension on the loose tube element 10. The control apparatus 70 comprises a computer 71 into which an operator enters the desired line speed and the selected size and composition specifications of the plastic sheath. The computer 71 sends a signal of intended line speed to first controller 73, which controls rotation of a servo motor (not shown) which drives the constant speed capstan 30 by coupling through a gearbox (not shown) and shaft 31 such that the intended line speed can be realized. Stored in the memory of computer 71 is a predefined relationship 72 between line speed and tension for various given sheath diameters and compositions. From this stored relationship 72, the computer 71 determines the appropriate tension setpoint for the given line speed and sheath diameter and composition. A signal containing the tension setpoint for the tension to be applied to the plastic sheath 13 is transmitted to a second controller 76. The second controller 76 also receives signals indicating actual tension on the loose tube element 10. As illustrated, a tension measuring device measures the force on the loose tube element passing through a given deflection, which is directly proportional to the tension in the element. The force is measured by a load cell sheave 74 located between a first idler sheave 77 and a second idler sheave 78 slightly upstream from the variable torque control capstan 41. During its travel after exiting the second cooling bath 38 the loose tube element 10 passes over the first idler sheave 77, under the load cell sheave 74 and over the second idler sheave 78. The measured force on the loose tube element is translated into a tension signal by a load cell device 75 connected to the load cell sheave 74. The second controller 76 compares the actual tension signal to the tension setpoint and sends a signal governing the speed of a torque control motor 79 which is coupled to the pulley 44 by an appropriate gear reducer (not shown). The pulley 44 engages the belt 42 and transfers force from torque control motor 79 to the loose tube element 10 so as to apply the appropriate tensile force to the element 10. In actual practice, the operator may enter a step change in line speed and the computer 71 will ramp the line speed from the current line speed to the new line speed at a predetermined rate. During this acceleration or deceleration period, the tension setpoint will be varied in relation to the line speed in accordance with the above.

Figure 7:
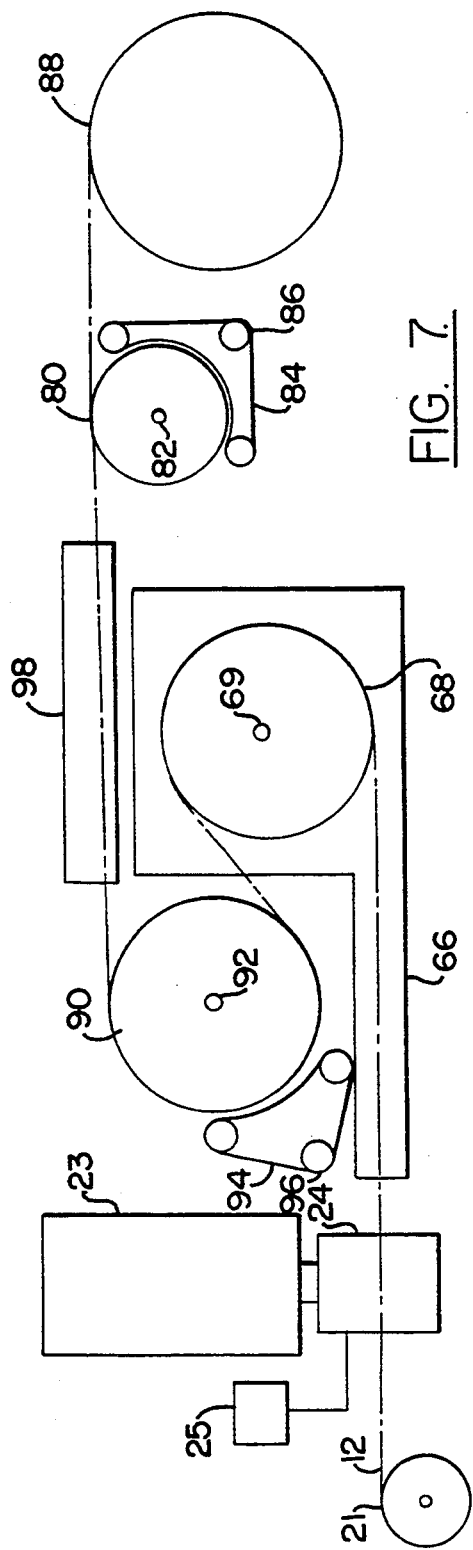
FIG. 7 is a schematic view of an alternate embodiment of a manufacturing line for making loose tube elements according to the present invention.
Figure 8:
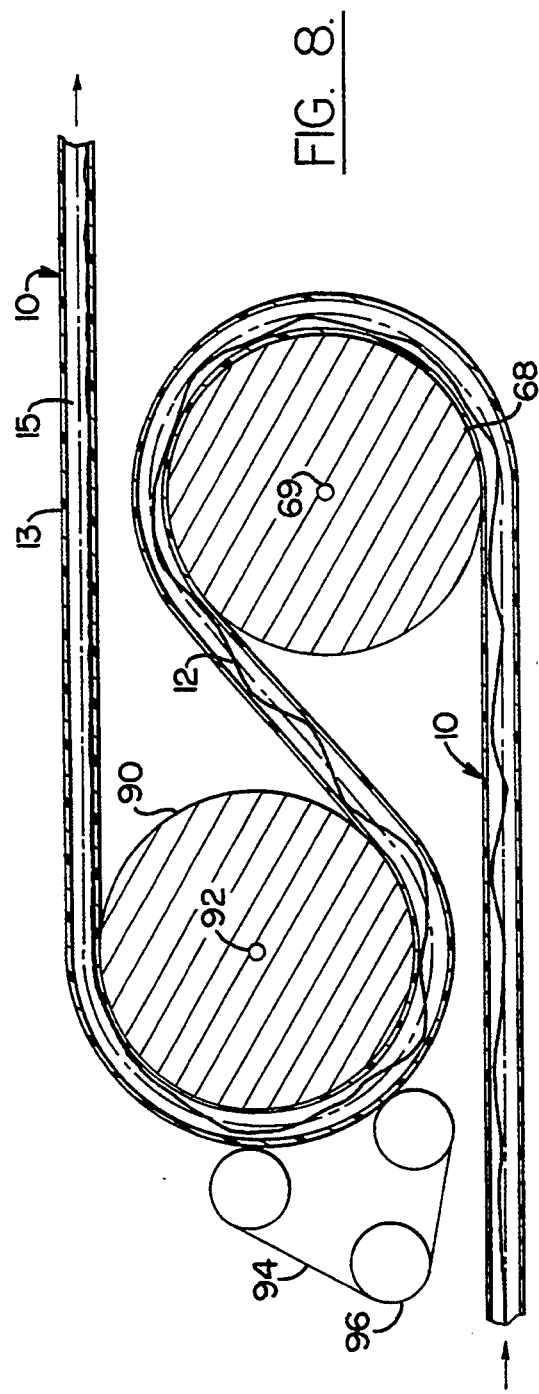
FIG. 8 is a sectional view of the turnaround and braking sheave of the embodiment of FIG. 7 showing the loose tube element as it enters and leaves the turnaround and braking sheave.

Referring now to FIG. 7, an apparatus is shown in accordance with an alternate embodiment of the present invention. This embodiment is similar in many respects to the embodiment previously described with reference to FIG. 2, and to avoid repetitive description, elements in this embodiment which correspond to elements previously described will be identified by corresponding reference characters. The apparatus comprises a fiber payoff 21, a metering pump 25 and an extruder 23 equipped with a cross-head 24. The loose tube element 10 is extruded in the same manner as described earlier with the preferred embodiment. The loose tube element 10 is pulled into a first cooling bath 66 within which is contained a turnaround capstan 68 which rotates about shaft 69. The loose tube element 10 is wrapped at least three times around the circumference of the turnaround capstan 68. The shaft 69 may be optionally assisted by a torque motor (not shown) to minimize the drag on loose tube element 10. This drag is especially important at higher line speeds because the loose tube element 10 may be very hot and could easily become elongated. The element exits the first cooling bath 66 and travels around brake capstan 90 which rotates about shaft 92. The element 10 is pulled around the brake capstan 90 by belt 94 which is engaged by pulley 96 which is in turn coupled to a torque motor (not shown). The braking force imparted to the element 10 by the torque motor varies with line speed because the temperature of the plastic sheath 13 varies with line speed since it passes through a cooling bath 66 of fixed length.

The sheath 13 is elongated as it exits brake capstan 90 and, as in the preferred embodiment, the fiber length to sheath length ratio is reduced below 1.0 prior to entering second cooling bath 98. As in the earlier embodiment, some thermal contraction of the plastic sheath 13 occurs while it is cooled to ambient temperature in the second cooling bath 98, thereby resulting in a fiber length to sheath length ratio slightly higher than 1.0. The tensile force is applied to the element by speed control capstan 80 which rotates about shaft 82, similar to that of the preferred embodiment. As in the preferred embodiment the element 10 may then be coiled about take-up reel 88 or may continue on for further processing.

The applicability of the present invention for producing a loose tube element is further seen in the following illustrative example.

EXAMPLE

A standard 12 fiber loose tube element with tube dimensions of 1.9 mm inner diameter and an 3.1 mm outer diameter is to be manufactured from Vestador 3000 PBT utilizing apparatus 20. Apparatus 20 contains a speed control capstan 30 having a diameter of 1.0 meters. The line is to be operated at a speed ranging from 25 to 200 meters per minute. The distance between the extruder crosshead 24 and entry to the capstan 30 is 6 meters. The grease-like material has a critical yield stress between 35 Pa and 70 Pa.

Chilled water at a temperature of 10° C. is utilized in first cooling bath 28 and chilled water at a temperature of 18° C. is utilized in second cooling bath 38. Based on this information, it is anticipated that the fiber-to-sheath length ratio at the entry point to the speed control capstan 30 will vary in accordance with FIGS. 3A, 3B and 3C as the line speed is increased. At a low line speed, FIG. 3A would depict the anticipated location of the fiber 12. Since the residence time in the first cooling bath 28 would be approximately 15 seconds, the loose tube would be at a low temperature with much of the thermal contraction of the plastic sheath 13 having taken place close to the extruder crosshead, where resultant back tension on the fiber 12 could overcome the critical yield stress of the grease-like material 15. As the line speed is increased, the fiber 12 will begin to take the configuration as depicted in FIG. 3B, and at 200 meters per minute the fiber 12 would take the shape as depicted in FIG. 3C.

At 200 meters per minute, the residence time in first cooling bath 28 is less than 1.8 seconds, and the plastic sheath 13 is still relatively hot and continuing to undergo thermal contraction while engaging the capstan 30. The element 10 travels around the capstan 30 5-8 times before disengaging the capstan 30. Tension is applied to the plastic sheath as it disengages the capstan 30 by variable torque control capstan 41 and is variable as a function of line speed. The tension causes permanent elongation deformation of the plastic sheath material 13. This deformation and elongation causes the sheath 13 to slide along the surface of the capstan 30 during the last turn or wrap on the capstan just prior to disengagement of the element 10 from the capstan. During the period of application of the tensile force to the element 10, some component of the tensile force will be imparted to the bundle of optical fibers 12 contained therein causing them to move to the inner radius of curvature of the sheath 13 while on the capstan 30. The tensile force imparted to the optical fibers 12 must be maintained below the proof test strength of the optical fibers so as not to damage the fibers 12. Preferably, the tensile force imparted to the fibers 12 will not exceed 35 percent of the proof test strength. Optical fibers intended for use in telecommunications meet at least a 50 kpsi proof test requirement. Thus 35 percent proof test strength translates into a maximum fiber elongation of 0.3 percent and a tensile load of about 150 grams per fiber. Therefore, the maximum tensile load that can be imparted upon the 12 fiber bundle is 1.8 kilograms.

The elongation deformation of the plastic sheath 13 should occur at a temperature above which the plastic material reflects significant increase in elasticity. With Vestador 3000, a significant change in the flex modulus occurs at approximately 60° C., as seen from the following data:

| Temperature (°C.) | Flex Modulus (MPa) |
|---|---|
| −40 | 2740 |
| 0 | 2300 |
| 23 | 2300 |
| 60 | 565 |
| 160 | 190 |

Therefore the elongation should take place when the plastic sheath is at a temperature of about 60° C. or above for this particular polymer. If the fiber length to sheath length ratio is to be 1.0003 plus or minus 0.0003 at 20° C., then the fiber length to sheath length ratio must be lower than that at 60° C. due to the anticipated contraction of the plastic sheath 13 on cooling to ambient temperature. For a 40° C. temperature difference using Vestador 3000, with a thermal expansion coefficient of $7 \times 10^{-5}$/°C., the target fiber-to-sheath length ratio at 60° C. should be 0.9975. This ratio should be achieved at the point where the element 10 exits the capstan 30. The bulk of the elongation of the plastic sheath 13 occurs while the element is in the last quarter of rotation about the capstan 30 and in the space prior to entering the second cooling bath 38. As the loose tube element 10 is elongated while leaving the capstan 30, the fiber bundle 12 is pulled taut and overcomes the critical yield stress of the grease-like material 18 and positions itself adjacent to the inner circumference of the plastic sheath 13 as exhibited in FIGS. 4A, 4B and 4C.

Since the speed control capstan 30 has a diameter of 1.0 meters, the fiber-to-length ratio can be calculated for the situation in which the fiber bundle is positioned adjacent to the circumference of the inner wall of loose tube element 10. If D is the diameter of the capstan, and d is the diameter of the sheath having wall thickness t, and f is the effective diameter of the fiber bundle 12 then the fiber-to-sheath length ratio would be given by:

$$\frac{D + 2t + f}{D + d}.$$

Substituting the above values in this equation gives a value of 0.9990, as compared to the required fiber-to-sheath length ratio at 60° C. of 0.9975 as seen above. Therefore, the fiber would have to be stretched an additional 0.0015 or 0.15% in order to achieve this target fiber-to-sheath length ratio. Since the fiber can safely be elongated up to 0.3%, the above required stretching of the fiber can be safely accommodated. The relationship 72 for this set of conditions would be defined to respond across the line speed range to elongate the loose tube element 10 sufficiently to pull out all of the fiber-to-sheath overlength present in the loose tube element while on the constant speed control capstan 30 plus an additional elongation of the fiber of 0.15%. One suggested method to accomplish this would be to vary the torque at a constant line speed and observe the change in fiber-to-sheath length ratio on the final product. When an incremental change in torque results in less than its proportionate change in fiber-to-sheath length ratio, the point has been reached where the fiber bundle 12 is absorbing part of the increasing tensile load. This set of data gathering trials would be conducted at several line speeds in order to construct the proper torque versus line speed relationship for the particular tube size under investigation. The relationship can be stored in the computer for future reference.

The loose tube element 10 is cooled in the second cooling bath 38 to ambient temperature, while still subject to the tensile force from the variable torque control capstan 40. Upon cooling, the Vestador 3000 loses its elasticity and the elongation becomes permanent. Thus, by controlling the tensile force relative to line speed and plastic sheath size, the desired fiber length to sheath length ratio is achieved.

In the drawings and specification, there has been set forth a preferred embodiment of the invention, and although specific terms are employed, they are used in a generic and descriptive sense only and not for purposes of limitation.

What is claimed is:

1. A method for producing a loose tube element for a fiber optic cable, said method providing control of the length of the optical fiber relative to the length of an enclosing plastic sheath of the loose tube element and comprising the steps of:

advancing a fiber along a path of travel;

surrounding the advancing fiber with a loosely fitting plastic sheath to form a loose tube element;

applying a controlled tensile force to the plastic sheath while the sheath is at an elevated temperature to elongate the sheath; and cooling the plastic sheath to ambient temperature while the sheath is subject to said controlled tensile force to effect a permanent elongation in the plastic sheath.

2. The method according to claim 1 further comprising the step of winding the thus formed loose tube element onto a take-up reel.

3. The method according to claim 1 further comprising the step of coiling the thus formed loose tube element onto a rotating plate.

4. The method according to claim 1 further comprising adding a reinforcement element and a second plastic sheath to the thus formed loose tube element.

5. The method according to claim 1 wherein said step of surrounding the advancing fiber with a loosely fitting plastic sheath further comprises introducing a grease-like material into the space between the optical fiber and the loosely fitting plastic sheath.

6. The method according to claim 5 wherein said grease-like material has a critical yield stress greater than 35 Pa. and a drip temperature greater than 80° C.

7. The method according to claim 1 wherein said step of advancing the fiber along a path of travel includes maintaining a back tension on the fiber.

8. The method according to claim 7 wherein said step of maintaining a back tension includes maintaining the back tension in the range of 30 grams to 40 grams.

9. The method according to claim 1 wherein the step of surrounding the fiber with a plastic sheath includes forming the sheath of two or more layers of different plastic materials.

10. The method according to claim 1 including the step of controlling the amount of the tensile force applied to the sheath as a function of the rate of advancement of the fiber.

11. The method according to claim 1 wherein the step of applying a tensile force to the plastic sheath comprises coiling the advancing loose tube element a plurality of turns about a capstan and applying said tensile force to the sheath at a location downstream from the capstan.

12. The method according to claim 11 comprising controlling the temperature of the sheath while coiled about said capstan so that the sheath is still at an elevated temperature upon leaving said capstan.

13. The method according to claim 12 wherein the step of controlling the temperature of the sheath while coiled about said capstan comprises contacting the sheath with a liquid.

14. The method according to claim 12 including the further step of subjecting the sheath to a preliminary cooling step prior to coiling about said capstan.

15. The method according to claim 11 wherein the step of applying tensile force to the plastic sheath comprises directing the plastic sheath through a second pulling device located downstream from said capstan.

16. The method according to claim 15 including the step of varying the amount of the tensile force applied to the sheath as a function of the rate of advancement of the fiber.

17. The method according to claim 16 wherein said step of varying the amount of the tensile force is achieved by varying the relative speed of said capstan and said second pulling device.

18. The method according to claim 1 wherein the tensile force applied to said sheath during said cooling step is such that said optical fiber is also subject to tensile stress during at least some portion of said cooling step.

19. The method according to claim 1 further comprising preliminarily cooling the plastic sheath prior to said step of applying a tensile force.

20. The method according to claim 1 wherein said advancing step comprises advancing at least one bundle of optical fibers.

21. The method according to claim 1 wherein said advancing step comprises advancing at least one ribbon of optical fibers.

22. A method for producing a loose tube element for a fiber optic cable, said method providing control of the length of the optical fiber relative to the length of an enclosing plastic sheath of the loose tube element and comprising the steps of:

advancing a fiber along a path of travel while maintaining a back tension on the fiber;

surrounding the fiber with a loosely fitting plastic sheath while introducing a grease-like material into the space between the fiber and the loosely fitting plastic sheath to form a loose tube element;

cooling said loose tube element to an elevated temperature at which the sheath is readily deformable;

coiling the advancing fiber and plastic sheath element a plurality of turns about a capstan;

applying a controlled tensile force to said plastic sheath at a location downstream from the capstan to elongate the sheath while the sheath is at an elevated temperature; and cooling said plastic sheath to ambient temperature while the sheath is subject to said tensile force to effect a permanent elongation in the plastic sheath.

23. The method according to claim 22 further comprising varying the tensile force applied to the sheath as a function of the rate of advancement of the fiber.

24. The method according to claim 22 further comprising selecting a predetermined tensile force setpoint to be applied to the sheath for a given rate of advancement of the fiber.

25. The method according to claim 22 further comprising selecting a predetermined elevated temperature for said cooling step for a given rate of advancement of the fiber.

26. An apparatus for producing a loose tube element for a fiber optic cable, said apparatus providing control of the length of the optical fiber relative to the length of an enclosing plastic sheath of the loose tube element and comprising:

means for directing a fiber along a path of travel;

means disposed along said path of travel for surrounding the fiber in a loosely fitting plastic sheath to form a loose tube element;

first moving means disposed along said path of travel downstream from said surrounding means for advancing the loose tube element along said path of travel;

second moving means disposed along said path of travel downstream from said first moving means for applying a tensile force to the plastic sheath while the plastic sheath is at an elevated temperature to elongate the sheath; and cooling means disposed along said path of travel downstream from said second moving means for cooling the element to ambient temperature while the plastic sheath is subject to said tensile force to effect a permanent elongation in the plastic sheath.

27. The apparatus according to claim 26 further comprising a preliminary cooling means located along said path of travel subsequent to said surrounding means and before said first moving means.

28. The apparatus according to claim 26 further comprising means for receiving the element from said cooling means and taking up the element.

29. The apparatus according to claim 28 wherein said means for receiving and taking up the element comprises a reel.

30. The apparatus according to claim 28 wherein said means for receiving and taking up the element comprises a rotating plate.

31. The apparatus according to claim 26 further comprising means located downstream from said cooling means for applying at least one reinforcing element and at least one additional plastic sheath to the element.

32. The apparatus according to claim 26 wherein said means for directing an optical fiber along a path of travel includes means for maintaining a back tension on the optical fiber.

33. The apparatus according to claim 26 wherein said means for directing an optical fiber comprises means for directing at least one bundle of optical fibers along said path of travel.

34. The apparatus according to claim 26 wherein said means for directing an optical fiber comprises means for directing at least one ribbon of optical fiber along said path of travel.

35. The apparatus according to claim 26 wherein said enclosing means comprises an extruder for forming said loosely fitting plastic sheath and a pump adapted to pump a grease-like material into a space between said optical fiber and said plastic sheath.

36. The apparatus according to claim 26 wherein said first moving means comprises a rotating capstan, and wherein said loose tube element is coiled around said capstan a plurality of turns in its path of travel.

37. The apparatus according to claim 36 wherein said capstan includes a positive drive means adapted to maintain a braking force against movement of said element along said path.

38. The apparatus according to claim 37 wherein said capstan is constructed and arranged so that elongation of said plastic sheath occurs at about the point along said path of travel where said element exits from said capstan.

39. The apparatus according to claim 38 further comprising temperature control means for maintaining the temperature of said element at the point of elongation at a predetermined level.

40. The apparatus according to claim 26 wherein said second moving means includes means for maintaining said tensile force at a predetermined level.

41. The apparatus according to claim 40 wherein said means for maintaining said tensile force at a predetermined level includes means for varying said tensile force applied to the sheath as a function of the rate of advancement of the fiber.

42. The apparatus according to claim 41 wherein said second moving means comprises a variable torque control belt capstan.

43. An apparatus for producing a loose tube element for a fiber optic cable, said apparatus providing control of the length of the optical fiber relative to the length of an enclosing plastic sheath of the loose tube element, and comprising:
means for directing an optical fiber from a supply source along a path of travel while maintaining back tension on the optical fiber;
an extruder disposed along said path for forming a loosely fitting plastic sheath surrounding the optical fiber to produce a loose tube element;
a pump cooperating with said extruder for pumping a grease-like material into a space between the fiber and the plastic sheath;
first cooling means disposed along said path of travel downstream from said extruder for cooling the sheath;
a capstan disposed along said path of travel downstream from said first cooling means for advancing said element at a substantially constant velocity along said path of travel, the element being coiled a plurality of turns about said capstan so that the capstan maintains a predetermined braking force against advancement of said element along said path;
pulling means disposed along said path of travel downstream from said capstan, said pulling means comprising a variable torque control belt capstan adapted to apply a tensile force to the plastic sheath while the plastic sheath is at an elevated temperature to thereby elongate the sheath; and
second cooling means disposed along said path of travel downstream from said pulling means for cooling said element to ambient temperature while the plastic sheath is subject to said tensile force to effect a permanent elongation in the plastic sheath.

44. The apparatus according to claim 43 wherein said pulling means includes means to vary the tensile force applied to the sheath as a function of the rate of advancement of the fiber.

45. The apparatus according to claim 43 comprising:
a first controller cooperating with said capstan for controlling its speed of rotation;
means for measuring tension in the loose tube element at a location between said capstan and said pulling means, and
a second controller responsive to said tension measuring means and cooperating with said pulling means for controlling the operation of said pulling means so as to maintain the tension in the loose tube element at a given tension setpoint.

46. The apparatus according to claim 45 including a computer having input means to allow an operator to enter a selected line speed for operation of said extruder, and said computer including means responsive to input of a selected line speed for providing a tension setpoint for said second controller.

47. The apparatus according to claim 45 wherein said means for measuring tension comprises a sheave located along the path of travel of the loose tube element between said cooling means and said pulling means and positioned in engagement with the loose tube element; and a load cell connected to said sheave and operable to generate a signal which is a function of the amount of force on the loose tube element.

* * * * *